(12) United States Patent
Kaneko (10) Patent No.: US 6,169,857 B1
(45) Date of Patent: Jan. 2, 2001

(54) CONNECTION STRUCTURE FOR CAMERA AND ACCESSORY

(75) Inventor: Hidefumi Kaneko, Tokyo (JP)

(73) Assignee: Asahi Kogaku Kogyo Kabushiki Kaisha, Tokyo (JP)

( * ) Notice: Under 35 U.S.C. 154(b), the term of this patent shall be extended for 0 days.

(21) Appl. No.: 09/334,618

(22) Filed: Jun. 17, 1999

(30) Foreign Application Priority Data

Jun. 22, 1998 (JP) .................................................. 10-175100
Mar. 10, 1999 (JP) .................................................. 11-063269

(51) Int. Cl.[7] .................................................. G03B 17/00
(52) U.S. Cl. .......................................... 396/301; 396/425
(58) Field of Search .................................... 396/301, 388, 396/425, 420, 419

(56) References Cited

U.S. PATENT DOCUMENTS 4,464,031 * 8/1984 Iwashita et al. ..................... 396/388
5,325,143   6/1994 Kawano ................................ 396/59
5,530,473   6/1996 Sakai et al. .......................... 348/243

* cited by examiner

Primary Examiner—W. B. Perkey
(74) Attorney, Agent, or Firm—Greenblum & Bernstein, P.L.C.

(57) ABSTRACT

A camera system including a camera, and an accessory to be secured to the camera by means of a screw provided to an upper surface of the accessory and a threaded hole formed on a bottom surface of the camera. At least first and second circuits are respectively provided in the camera and the accessory. First and second connectors, each of which are electrically connected to the first circuit, are provided on the bottom surface of the camera. The first and second connectors arranged at opposite portions, with respect to the threaded holes on the bottom surface of the camera. Further, third and fourth connectors to be respectively connected to the first and second connectors are provided on the upper surface of the accessory. Each of the third and fourth connectors, which are electrically connected to the second circuit, are arranged at portions corresponding to the first and second connectors.

18 Claims, 7 Drawing Sheets

PRIOR ART

CONNECTION STRUCTURE FOR CAMERA AND ACCESSORY

BACKGROUND OF THE INVENTION

The present invention relates to a structure for electrically connecting a camera and an accessory which is coupled to the camera.

Conventionally, a camera is provided with a tripod socket on its bottom surface. The tripod socket is formed as a threaded opening, with which a tripod screw is engaged to secure the camera on a tripod head. The tripod socket can be used not only for mounting the camera on the tripod head, but also used for coupling various camera accessories to the camera.

Recent cameras are electronically controlled, and for supplying electrical power, batteries are generally accommodated in the camera bodies. In order to enhance power supply capacity, an accessory which is known as a battery grip and accommodates a battery having a larger capacity than the interior battery is coupled to the camera.

Figure 6:
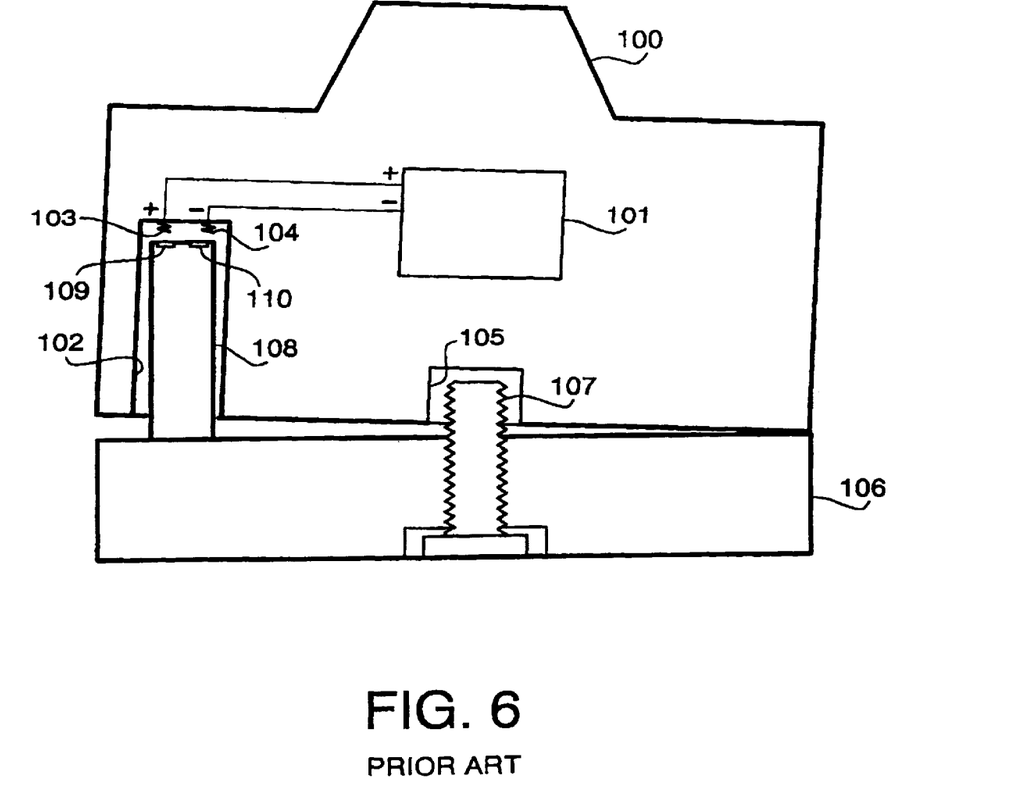
FIG. 6 schematically shows a conventional connection structure of a camera and a battery grip.

FIG. 6 schematically shows a conventional connection structure of a camera and a battery grip.

As shown in FIG. 6, a camera 100 is formed with a battery chamber 102, which holds a battery. The battery chamber 102 has an opening on the bottom surface of the camera 100 through which batteries can be exchanged. On an upper inner surface of the battery chamber 102, a pair of positive and negative electrodes 103 and 104 are provided. When an interior battery is inserted in the battery chamber 102, the positive and negative electrodes 103 and 104 contact positive and negative a negative electrodes of the battery.

When a battery unit 106 is used, the battery is removed from the battery chamber 102, and an adapter 108, which is formed on a top surface of the battery unit 106 to have the same shape of the battery, is inserted in the battery chamber 102.

In a central portion of a bottom surface of the camera 100, a tripod socket 105 is formed. The battery unit 106 is provided with a screw 107 to be engaged with the tripod socket 105 of the camera 105. The screw 107 is inserted in a through hole formed in the battery unit 106, and a tip of the threaded portion is protruded from the top surface of the battery unit 106. On the bottom surface side of the battery unit 106, a head of the screw 107 is located. By fastening the screw 107 with the tip end thereof inserted in the tripod socket 105, the battery unit 106 is secured to the camera 100.

On a top surface of the adapter 108, positive and negative electrodes 109 and 110 are formed. The positive and negative electrodes 109 and 110 are connected to positive and negative poles of the battery (i.e., the external battery) accommodated in the battery unit 106. When the screw 107 is firmly fastened and the battery unit 106 is coupled to the camera 100, the electrodes 109 and 110 contact the electrodes 103 and 104 so that electrical power is supplied from the battery unit 106 to a circuit 101 of the camera 100.

The conventional connection structure described above has a drawback as indicated below.

Since the battery unit 106 is coupled to the camera 100 only by engagement of the screw 107 with the threaded socket 105, if an external force for separating left-hand side portions, in FIG. 6, of the camera 100 and of the battery unit 106 is applied, the electrodes 109 and 110 may be detached from the electrodes 103 and 104, which disconnects power supply from the battery unit 106 to the camera 100.

SUMMARY OF THE INVENTION

It is therefore an object of the present invention to provide an improved structure for electrically connecting two devices, which are coupled such that a surface of one of the devices contact a surface of the other and secured at one point, for example by a screw, a plurality of contacts being provided on the contacted surfaces.

For the above object, according to the present invention, there is provided a connection structure for connecting at least first and second circuits respectively provided in first and second devices. The first and second devices respectively have first and second surfaces, and the second device is secured to the first device, with the first and second surfaces being contacted. The second device is secured to the first device by means of a single screw provided to the second device and a threaded hole which receives the screw, formed on the first device. The connection structure includes:

(1) first and second connectors provided on the first surface, each of the first and second connectors electrically connected to the first circuit, the first and second connectors arranged at opposite portions, with respect to the threaded holes on the first surface; and (2) third and fourth connectors to be respectively connected to the first and second connectors, the third and fourth connectors provided on the second surface, each of the third and fourth connectors electrically connected to the second circuit, the third and fourth connectors arranged at portions corresponding to the first and second connectors.

With this structure, at least one of (a) first and third connectors or (b) second and fourth connectors remain contacted even if an external force is applied to separate the first and second devices. Accordingly, electrical connection between the first and second circuits is maintained without failure.

Optionally, the first contact, the threaded hole, and the second contact may be arranged substantially on a same line. With this arrangement, the electrical connection between the first and second circuits is highly ensured.

Alternatively, an angle formed between a line connecting the first contact and the threaded hole, and another line connecting the threaded hole and the second contact is within a range between 90 degrees to 270 degrees.

If the above condition is satisfied, electrical connection between the first and second circuits may not be lost even if the external force is applied in a direction of separating the first and second devices.

In one case, a signal related to an operation of one of the first and second circuits is transmitted from the other of the first and second circuits, through the first, second, third and fourth connectors.

Optionally or alternatively, the electrical power may be supplied from one of the first and second circuits to the other of the first and second circuits, through the first, second, third and fourth connectors.

According to another aspect of the invention, there is provided a connection structure which includes:

(1) first and second connectors provided on the first surface, each of the first and second connectors electrically connected to the first circuit; and (2) third and fourth connectors to be respectively connected to the first and second connectors, the third and fourth connectors provided on the second surface, each of the third and fourth connectors electrically connected to the second circuit.

The first, second, third and fourth connectors are arranged such that:

(a) the first and second connectors neutrally connected to the third and fourth connectors, respectively, (b) if the first connector is detached from the third connector, connection between the second and fourth connectors are tightened, and (c) if the second connector is detached from the fourth connector, connection between the first and third connectors are tightened Also with this structure, at least one of (a) first and third connectors or (b) second and fourth connectors remain contacted even if an external force is applied to separate the first and second devices. Accordingly, electrical connection between the first and second circuits is maintained without failure.

According to still another aspect of the invention, there is provided, a camera system, which is provided with:

a camera;

an accessory to be secured to the camera, at least first and second circuits being respectively provided in the camera and the accessory, the accessory being secured to the camera by means of a screw provided to an upper surface of the accessory and a threaded hole formed on a bottom surface of the camera, first and second connectors provided on the bottom surface of the camera, each of the first and second connectors electrically connected to the first circuit, the first and second connectors arranged at opposite portions, with respect to the threaded holes on the bottom surface of the camera; and third and fourth connectors to be respectively connected to the first and second connectors, the third and fourth connectors provided on the upper surface of the accessory, each of the third and fourth connectors electrically connected to the second circuit, the third and fourth connectors arranged at portions corresponding to the first and second connectors.

With this structure, at least one of (a) first and third connectors or (b) second and fourth connectors remain contacted even if an external force is applied to separate the first and second devices. Accordingly, electrical connection between the camera and the accessory is maintained without failure.

Optionally, the second circuit may be constituded to supply electric power for operation to the first circuit through the first, second, third and fourth connectors. In this case, preferably, the accessory is a battery grip, and wherein the second circuit includes a battery. Specifically, the first connector may include electrodes provided in a battery chamber of the camera, and the third connector may include electrodes provided on a adapter to be inserted in the battery chamber.

Optionally or alternatively, the second circuit may be constituted to supply a signal related to an operation of the first circuit through the first, second, third and fourth connectors.

Further optionally, the second circuit may include a switch member, and the second circuit transmits a signal upon operation of the switch member.

Yet optionally, an angle formed between a line connecting the first contact and the threaded hole, and another line connecting the threaded hole and the second contact is within a range between 90 degrees to 270 degrees.

Preferably or in view of design of a camera and an accessory, an angle formed between a line connecting the first contact and the threaded hole, and another line connecting the threaded hole and the second contact may be within a range between 225 degrees to 180 degrees.

DESCRIPTION OF THE EMBODIMENTS

The present invention will be described with reference to the accompanying drawings.

[First Embodiment]

Figure 1A:
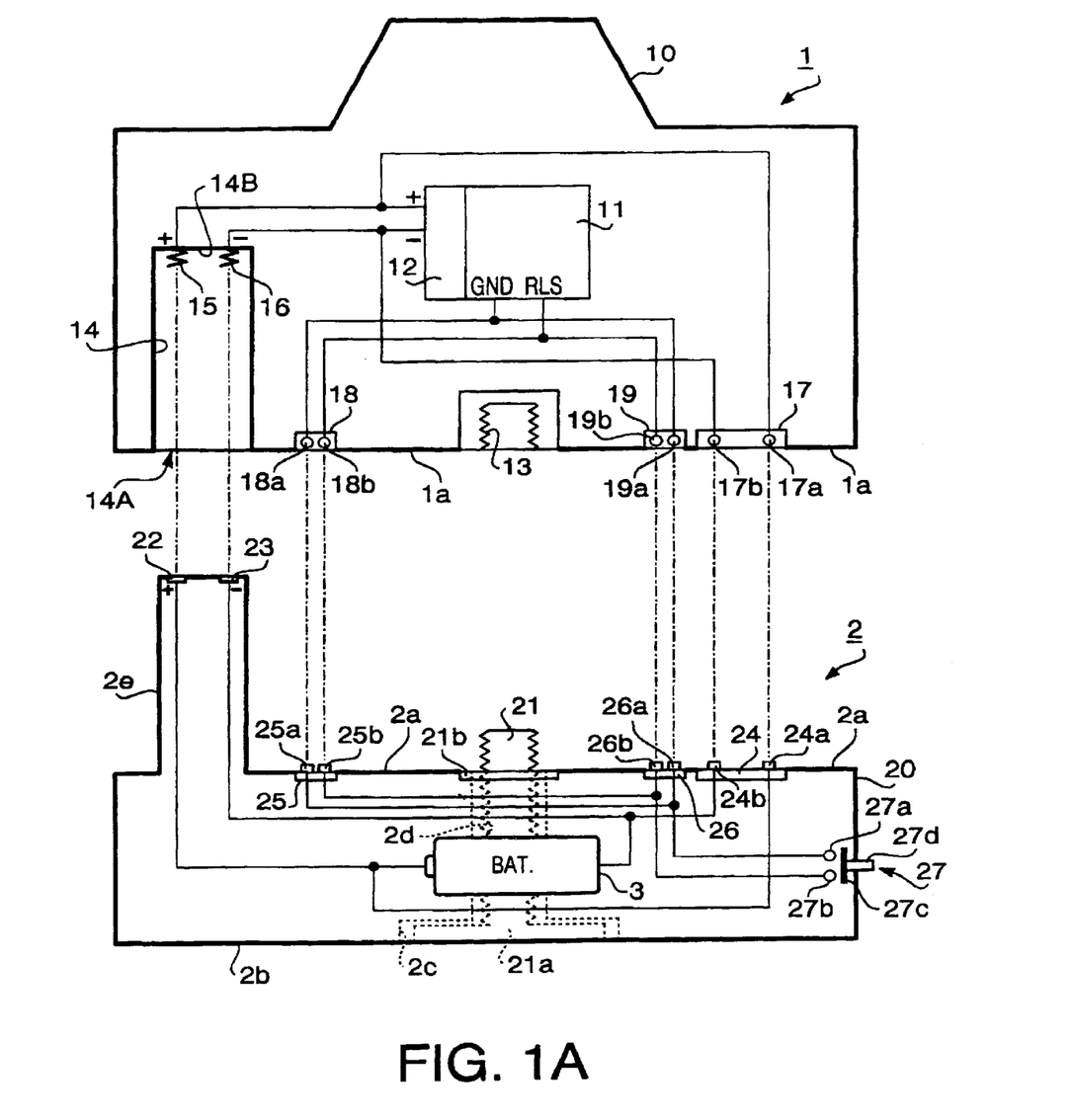
FIG. 1A schematically shows a constitution of a camera and a battery grip according to a first embodiment of the invention.
Figure 1B:
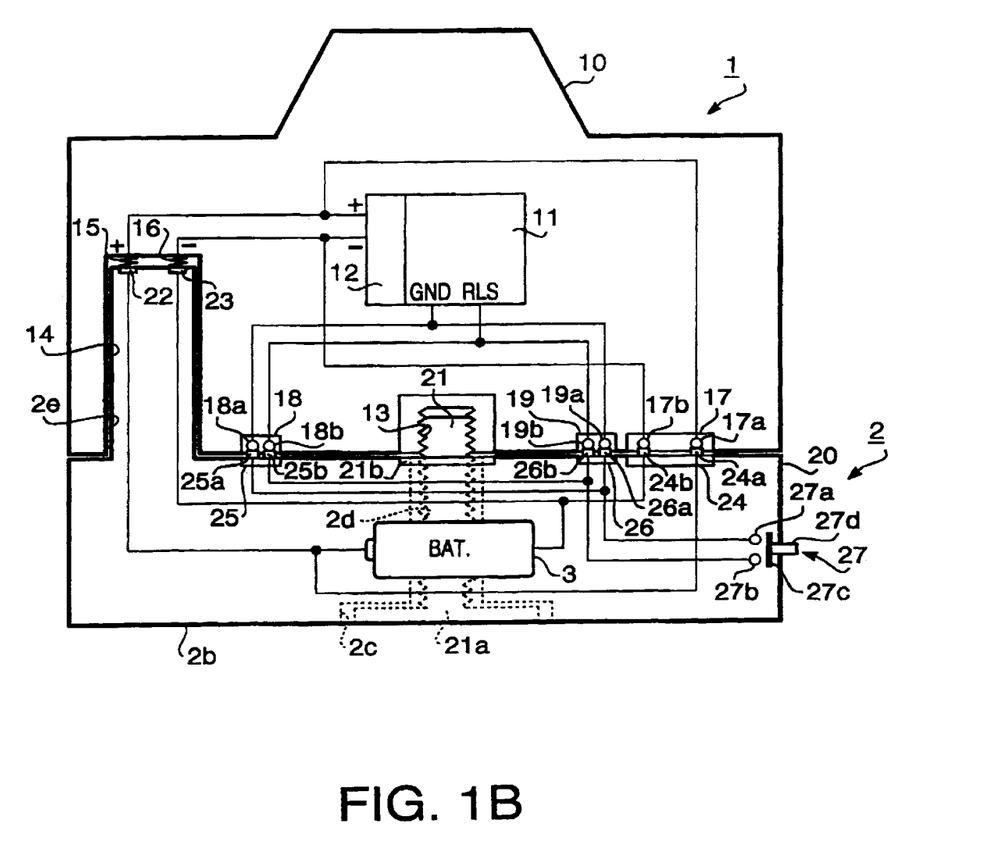
FIG. 1B schematically shows a constitution of the camera and the battery grip according to a first embodiment, when the battery grip is secured to the camera.

FIGS. 1A and 1B show a constitution of a camera 1 and a battery grip 2 according to a first embodiment of the present invention. FIG. 1A shows a condition where the battery grip 2 is detached from the camera 1, and FIG. 1B shows a condition where the battery grip 2 is secured to the camera 1.

As shown in FIG. 1A, the camera 1 has a casing 10, and inside the casing 10, a microcomputer 11 and a voltage regulator 12 are provided. The microcomputer 11 controls various systems (not shown) provided in the camera 1, and performs various operations such as shutter-release, automatic exposure control, automatic focusing, and the like. The regulator 12 stabilizes the voltage applied from a battery and supplies the stabilized voltage to the microcomputer 11.

The microcomputer 11 has ports used to exchange signals with other internal and external systems. In FIG. 1A, a ground port (shown as GND) electrical potential of which is maintained at the ground level, and a release port (shown as RLS) are shown. When the ground port GND and the release port RLS are shorted, release operation is initiated.

The regulator 12 has positive and negative input ports to which voltage is applied by a battery.

Figure 2A:
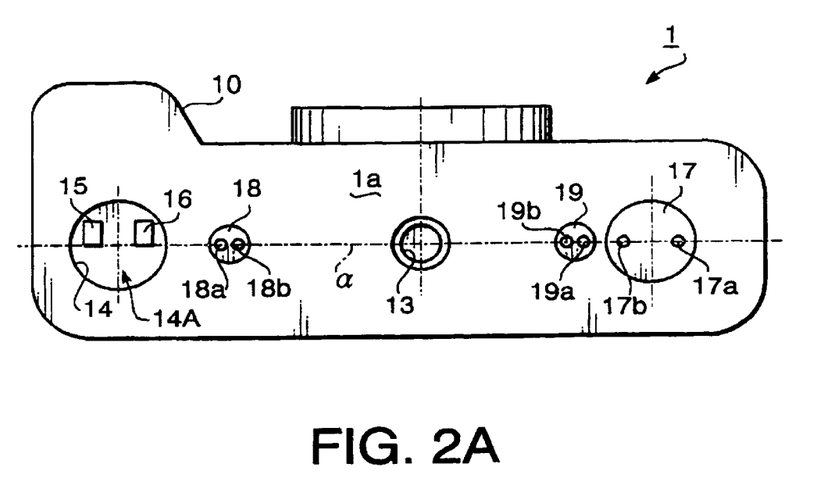
FIG. 2A is a bottom view of the camera shown in FIG. 1A.

FIG. 2A is a bottom view showing a bottom surface 1a of the casing 10 of the camera 1. The bottom surface 1a of the camera 1 is a flat surface. At a central portion of the bottom surface 1a, a threaded hole 13 is formed to receive a tripod screw when the camera 1 is secured onto a tripod head. As is well known, the threaded hole 13 is also used for securing various camera accessories to the camera 1. The camera 1 has a battery chamber 14, which has an opening 14A at an side end portion (right-hand side portion in FIG. 2A) on the bottom surface 1a. When the camera 1 is used without a battery grip, which will be described later, a battery (e.g., a Lithium ion battery) is inserted, through the opening 14A, in the battery chamber 14. On an upper inner surface 14B of the battery chamber 14, a positive electrode 15 and a negative electrode 16 are provided, which respectively contact positive and negative poles of the battery when held in the battery chamber 14.

The positive electrode 15 is connected to the positive input port of the regulator 12, and the negative electrode 16 is connected to the negative input of the regulator 12. The positive electrode 15 and the negative electrode 16 are also connected to various circuits in the camera 1 and supply them with electric power. However, in order to avoid complexity in the drawings, only the regulator 12 is shown as an example of a circuit connected to the positive and negative electrodes 15 and 16.

As shown in FIGS. 1A, 1B and 2A, a power supply sub-connector 17 is provide on the bottom surface 1a of the camera 1, on an opposite side, with respect to the threaded hole 13, of the battery chamber opening 14A. The power supply sub-connector 17 has a positive contact 17a and a negative contact 17b, which are exposed outward. The positive and negative contacts 17a and 17b of the power supply sub-connector 17 are also connected with the positive and negative ports of the regulator 12, respectively, as shown in FIG. 1A.

On the bottom surface 1a, between the battery holder opening 14A and the threaded hole 13, a first signal connector 18 is provided. At a portion opposite to the first signal connector 18, with respect to the threaded hole 13, a second signal connector 19 is provided, between the threaded hole 13 and the power supply sub-connector 17. The signal connector 18 has a ground contact 18a and a release contact 18b, which are exposed outward. The second signal connector 19 also includes a ground contact 19a and a release contact 19b, which are exposed outward. The ground contacts 18a and 19a are connected to the GND port of the microcomputer 11, and the release contacts 18b and 19b are connected to the RLS port of the microcomputer 11.

The battery grip 2 has a casing 20 which is formed to be substantially rectangular parallelpiped and is to be coupled to the camera 1 with an upper surface 2a of the casing 20 contacted with the bottom surface 1a of the casing 10. At the center of a bottom surface 2b of the casing 20, a circular recess 2c is formed. Further, at the center of the recess 2c, a through hole 2d which has a smaller diameter than that of the recess 2c is formed. A bolt 21 is fitted in the through hole 2d with a tip portion thereof protruded from the upper surface 2a, and with a bolt head 21a seated in the recess 2c. A C-ring 21b is provided to the bolt 21 to prevent the bolt 21 from slipping off from the through hole 21b.

The battery grip 2 accommodates a battery 3 inside the casing 20. The battery 3 may be either a primary cell such as dry battery or a secondary cell (i.e., a rechargeable cell).

Figure 2B:
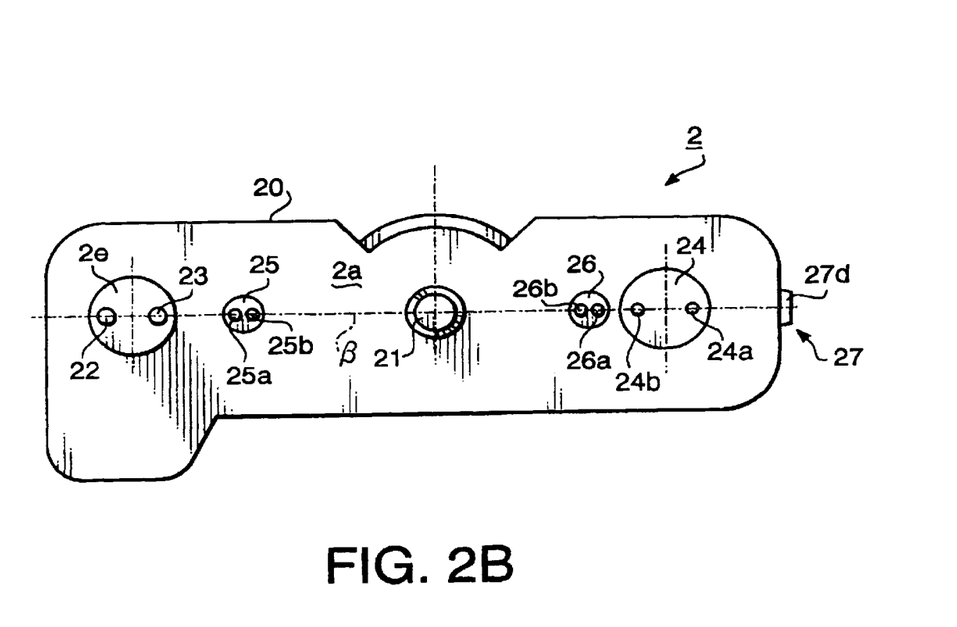
FIG. 2B is a plan view of the battery grip shown in FIG. 1A.

FIG. 2B shows the upper surface 2a of the casing 20. On the upper surface 2a, at a portion facing the battery holder opening 14A when the battery grip 2 is coupled to the camera 1, an adapter 2e, which has substantially the same shape as a battery that can be held in the battery holder 14, is formed. On a top surface of the adapter 2e, a positive electrode 22 and a negative electrode 23 are provided, which are connected to the positive and negative poles of the battery 3, respectively.

When the bolt 21 is screwed into the threaded hole 13 to secure the battery grip 2 to the camera 1, the adapter 2e is inserted into the battery holder 14, and the positive electrode 22 and the negative electrode 23 respectively contact the positive electrode 15 and the negative electrode 16 of the camera 1 so that electric power can be supplied from the battery 3 to the regulator 12 in the camera 1.

On a portion of the upper surface 2a facing the power supply sub-connector 17 when the battery grip 2 is secured to the camera 1 (see FIG. 1B), a power supply sub-connector 24 is provided. The power supply sub-connector 24 has a positive pin 24a and a negative pin 24b, which contact the positive power supply contact 17a and the negative power supply contact 17b, respectively, when the battery grip 2 is secured to the camera 1. Accordingly, when the battery grip 2 is secured to the camera 1, the electric power is also supplied from the battery 3 to the regulator 12 through the positive and negative pins 24a and 24b, and the positive and negative power supply contact 17a and 17b.

At a portion between the bolt 21 and the adapter 2e on the upper surface 2a, which faces the signal connector 18 when the battery grip 2 is secured to the camera 1 (see FIG. 1B), a signal connector 25 is provided. The signal connector includes a ground pin 25a and a release pin 25b, which contact the ground contact 18a and the release contact 18b of the signal connector 18, respectively.

At a portion between the bolt 21 and the power supply sub-connector 24 on the upper surface 2a, which faces the signal connector 19 when the battery grip 2 is secured to the camera 1 (see FIG. 1B), a signal connector 26 is provided. The signal connector 26 includes a ground pin 26a and a release pin 26b, which contact the ground contact 19a and the release contact 19b of the signal connector 19, respectively.

As shown in FIGS. 1A and 1B, the ground pin 25a and the ground pin 26a are connected, and the release pin 25b and the release pin 26b are connected. Further, both the ground pins 25a and 26a are connected with a contact 27a of a release switch 27 provided to the battery grip 2, and the release pin 25b and 26b are connected with a contact 27b of the release switch 27.

The release switch 27 is for initiating a shutter release operation of the camera 1. The release switch 27 is provided with a switch plate 27c, which is neutrally biased to be located apart from the contacts 27a and 27b. When a release button 27d is depressed, the switch plates 27c contacts both the contacts 27a and 27b to electrically connects the same (i.e., shorts the contacts 27a and 27b).

Figure 3:
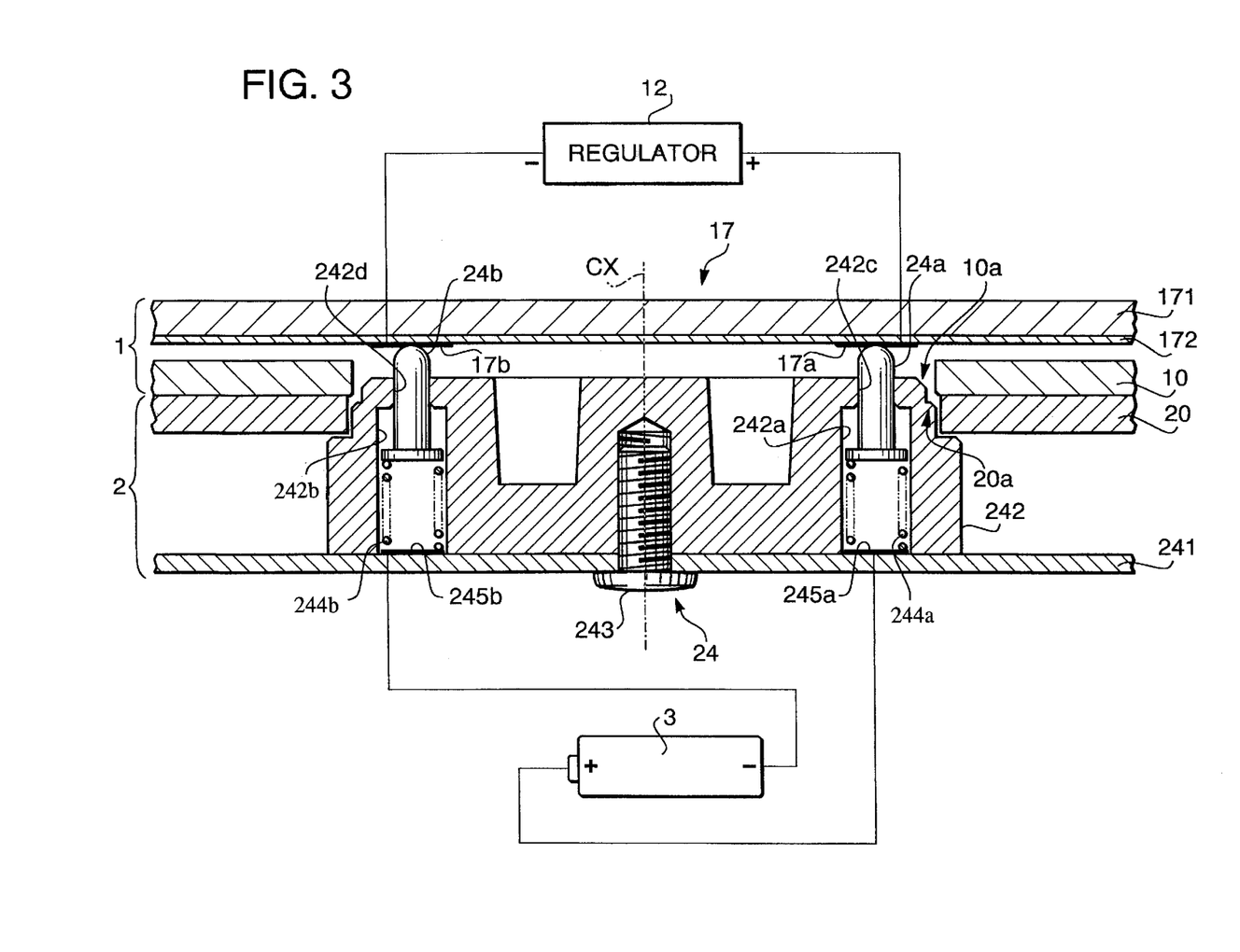
FIG. 3 shows a structure of a sub-connector for power supply.

FIG. 3 is an enlarged cross-sectional view of a portion where the sub-connectors 17 and 24 are connected.

As shown in FIGS. 2A and 3, the power supply sub-connector 17 has, on the bottom surface 1a of the casing 10 of the camera 1, a circular opening 10a. As shown in FIG. 3, inside the casing 10, a flexible plate supporter 171 is provided, and on a bottom side surface of the flexible plate supporter 171, a flexible printed circuit board (hereinafter, referred to as a flexible board) 172 is provided. The positive contact 17a and the negative contact 17b are formed on the flexible board 172 at a portion facing the opening 10a. Each of the contacts 17a and 17b is formed as a land of a printed circuit that is formed on the flexible board 172. In this embodiment, the positive contact 17a and the negative contact 17b are arranged symmetrically with respect to a center CX of the circular opening 10a (see FIG. 3).

The power supply sub-connector 24 has a circular opening 20a formed on the upper surface 2a of the casing 20 (see FIG. 3). The center of the opening 10a coincides with the center CX of the opening 20a when the battery grip 2 is secured, in place, to the camera 1 (i.e., the line CX also represents the center of the opening 10a).

As shown in FIG. 3, inside the battery grip 2, a rigid plate 241 is provided. Facing the opening 20a, a pin holder 242, which has a cylindrical shape, is fixed onto the rigid plate 241 by means of a screw 243. The upper end portion of the pin holder 242 is formed to have two stepped portions such that the uppermost portion has the smallest diameter, and an intermediate portion has a diameter greater than the uppermost portion but smaller than the lower portion. The intermediate portion of the pin holder 242 is fitted in the opening 20a and fixed thereat. The uppermost portion of the pin holder 242 having the smallest diameter is slightly protruded from the upper surface level of the casing 20 and inserted into the opening 10a so that a positional relationship between the power supply sub-connectors 17 and 24 is adjusted.

The pin holder 242 has two through holes 242a and 242b at the positions facing the positive and negative contacts 17a and 17b. Each of the through holes 242a and 242b extends in a direction parallel to the center CX of the opening 20a. A cross section, on a plane perpendicular to the surface of FIG. 3, of each of the through holes 242a and 242b is circular. A camera side portion (i.e., an upper side portion in FIG. 3) of each of the through holes 242a and 242b is formed to have a smaller diameter than the diameter of the rigid plate side portion.

As shown in FIG. 3, the positive pin 24a and the negative pin 24b are inserted in the through holes 242a and 242b. The positive and negative pins 24a and 24b are formed to be substantially cylindrical members, whose diameter is substantially the same as that of the camera side portions 242c and 242d. A camera side tip end of the positive and negative pins 24a and 24b are formed to be rounded ends, and the other ends (i.e., the rigid plate side ends) of the positive and negative pins 24a and 24b are formed with flanges, whose diameter is greater than that of the camera side portion 242c and 242d, respectively. Coil springs 244a and 244b, which are formed of conductive material, are provided between each of the flanges of the positive and negative pins 24a and 24b, and the rigid plate 241 for biasing the pins 24a and 24b towards the camera side.

With this constitution, the upper end portions of the positive and negative pins 24a and 24b are biased to protrude from the through holes 242a and 242b, respectively. Portions of the rigid plate 241 facing the through holes 242a and 242b are formed to be conductive lands 245a and 245b, which are connected with the positive and negative poles of the battery 3, respectively, as shown in FIG. 3. Accordingly, the electrical power is supplied from the battery 3 to the regulator 12 through the contacts 24 and 17 when the battery grip 2 is secured to the camera 1.

The above-described structure of the contacts is also employed in the contacts 18, 19, 25 and 26. It should be noted, however, the structure of the contacts described above with reference to FIG. 3 is an only one of possible structures, and is intended to assist in understanding the invention.

With the above constitution of the camera 1 and the battery grip 2, the bolt 21 is fully threaded into the threaded hole 13 to secure the battery grip 2 to the camera 1, with the adapter 2e inserted into the battery holder 14.

If the battery grip 2 is correctly secured to the camera 1, as shown in FIG. 1B:

(1) the adapter 2e is fully inserted in the battery holder 14 and the electrodes 15 and 16 respectively contact electrodes 22 and 23 provided on the upper surface of the adapter 2e;

(2) the positive and negative contacts 17a and 17b respectively contact the positive pins 24a and 24b;

(3) the ground contact 18a and the release contacts 18b respectively contact the ground pin 25a and the release pin 25b; and (4) the ground contact 19a and the release contact 19b respectively contact the ground pin 26a and the release pin 26b.

Thus, the electric power of the battery 3 in the battery grip 2 is supplied to the regulator 12 of the camera 1. Further, if the release switch 27 is depressed, the GND port and RLS port of the microcomputer 11 are shorted, and the shutter release operation is executed.

If an external force to detach the battery grip 2 from the camera 1 at the left-hand side portion in the FIG. 1B, the adapter 2e may be slightly withdrawn from the battery holder 14, and the positive electrode 22 and the negative electrode 23 of the adapter 2e may be separated from the positive electrode 15 and the negative electrode 16. Further, the ground pin 25a may be separated from the ground contact 18a, and the release pin 25b may be separated from the release contact 18b.

However, in the condition described above, the right-hand side portion of the battery grip 2 in FIG. 1B will be pressed against the camera 1 since the battery grip 2 works as a lever rotatable about the position where the bolt 21 is engaged with the threaded hole 13. Thus, contact between the positive contact 17a and the positive pin 24a, between the negative contact 17b and the negative pin 24b, between the ground contact 19a and the ground pin 26a, and between the release contact 19b and the release pin 26b is tightened. Therefore, power supply from the battery 3 to the regulator 12 of the camera 1 is ensured even if such an external force is applied. Further, operation of the release switch 27 is signaled to the microcomputer 11 without failure.

If an external force to detach the battery grip 2 from the camera 1 at the right-hand side portion in the FIG. 1B, contact between the positive electrode 22 and the positive electrode 15, between the negative electrode 23 and the negative electrode 16, between the ground pin 25a and the ground contact 18a, and between the release pin 25b and the release contact 18b is tightened. Accordingly, also in this case, power supply from the battery 3 to the regulator 12 of the camera 1 is ensured even if such an external force is applied. Further, signal transmission indicating operation of the release switch 27 to the microcomputer 11 is also ensured.

In the first embodiment, the electrodes 15, 16, the center of the threaded hole 13, the contacts 17a and 17b are arranged on the same line α viewed from the bottom side of the camera 1, as shown in FIG. 2A. Similarly, the electrodes 22, 23, the center of the bolt 21, the pins 24a and 24b are arranged along the same line β. Further, the contacts 18a, 18b, 19a and 19b are arranged on the same line α, and the pins 25a, 25b, 26a and 26b are arranged along the same line β. The line α and the line β are parallel to each other when the battery grip 2 is secured to the camera 1. A direction in which the bolt 21 proceeds when rotated is substantially perpendicular to the lines α and β (and surfaces 1a and 2a).

Possibility of the electrodes 22 and 23 detaching from the electrodes 15 and 16 is the greatest when the external force is applied on a plane including the line α and the line β. Since the connectors 17 and 24 are provided on opposite side of the electrodes 15, 16, 22 and 23, when connection between electrodes 15, 16 and 22, 23 is loosened due to the external force on the plane parallel to the lines α and β, the connection between the connectors 17 and 24 is tightened. Thus, the electrical power is supplied from the battery grip 2 to the camera 1 without fail. Similarly, when the connection between the connectors 17 and 24 is loosened due to the external force on the plane parallel to the lines α and β, the connection between electrodes 15, 16 and 22, 23 is tightened. Thus, also in this case, the electrical power is supplied from the battery grip 2 to the camera 1 without fail. The contacts 18a, 18b, 19a and 19b, and the pins 25a, 25b, 26a and 26b function in accordance with the same principle.

[The Second Embodiment]

Figure 4A:
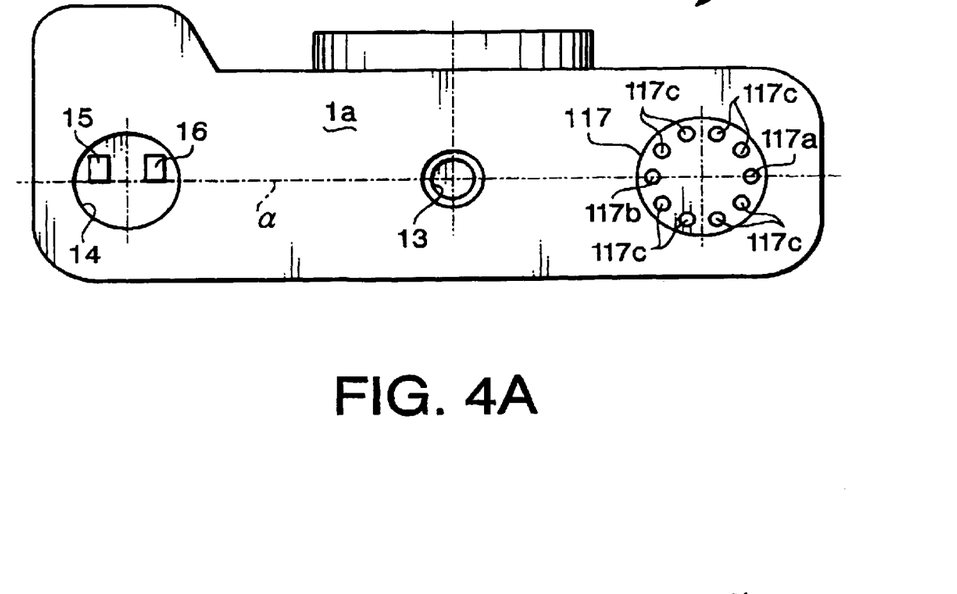
FIG. 4A is a bottom view of a camera according to a second embodiment of the invention.
Figure 4B:
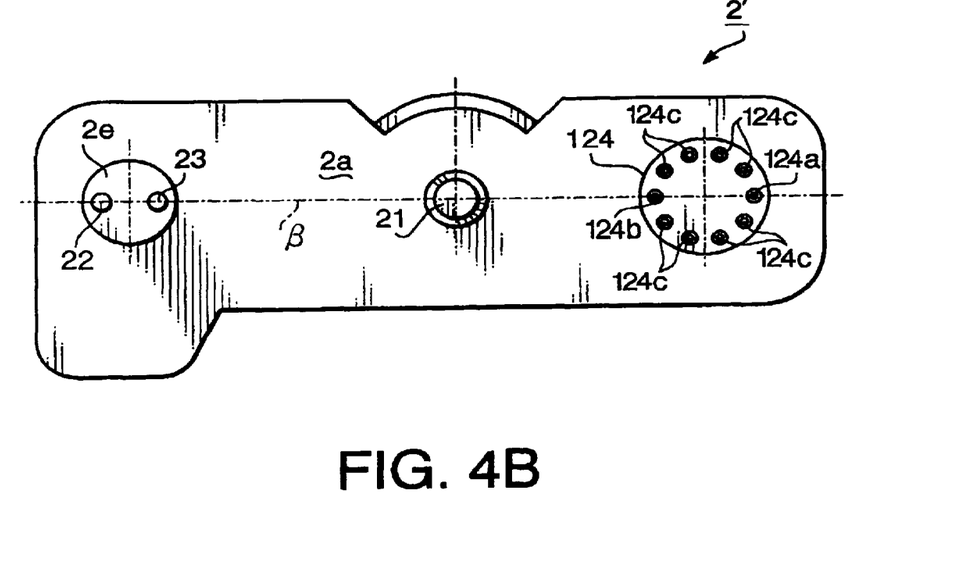
FIG. 4B is a plan view of a battery grip according to the second embodiment of the invention.

FIG. 4A is a bottom view of a camera 1', and FIG. 4B is a plan view of a battery grip 2' according to the second embodiment of the present invention.

The second embodiment is different from the first embodiment in that the connectors 18, 19, 25 and 26 are omitted. Further, in the second embodiment, a signal connector 117 is provided instead of the power supply subconnector 17 on the bottom surface 1a of the camera 1', and a signal connector 124 is provided corresponding to the signal connector 117, instead of the power supply subconnector 24 on the upper surface 2a of the battery grip 2'.

The signal connector 117 is provided with a plurality of contacts 117c, and the signal connector 124 is provided with a plurality of pins 124c corresponding to the plurality of contacts 117c. The contacts 117c and pins 124c transmit various signals. The signal connector 117 is also provided with a pair of contacts 117a and 117b which are not used for signal transmission. Corresponding to the contacts 117a and 117b, the signal connector 124 is also provided with a pair of pins 124a and 124b, which are not used for signal transmission.

In the second embodiment, the contacts 117a and 117b, and the pins 124a and 124b are used for supplying electrical power from the battery accommodated in the battery grip 2' to the camera 1'. In other words, the contacts 117a and 117b of the second embodiment respectively correspond to the contacts 17a and 17b of the first embodiment, and the pins 124a and 124b of the second embodiment respectively correspond to the pins 24a and 24b of the first embodiment.

The structure shown in FIG. 3 can be employed in the second embodiment. That is, the connectors 117 and 124 may be constituted to have the similar structure as the connectors 17 and 24 of the first embodiment.

In the second embodiment, the electrodes 15, 16, the center of the threaded hole 13, the contacts 117a and 117b are arranged on the same line α viewed from the bottom side of the camera 1', as shown in FIG. 4A. Similarly, the electrodes 22, 23, the center of the bolt 21, the pins 124a and 124b are arranged along the same line β. The line α and the line β are parallel to each other when the battery grip 2' is secured to the camera 1'.

Possibility of the electrodes 22 and 23 detaching from the electrodes 15 and 16 is the greatest when the external force is applied on a plane including the line α and the line β. Since the connectors 117 and 124 are provided on opposite side of the electrodes 15, 16, 22 and 23, when connection between electrodes 15, 16 and 22, 23 is loosened due to the external force on the plane parallel to the lines α and β, the connection between the connectors 117 and 124 is tightened. Thus, the electrical power is supplied from the battery grip 2' to the camera 1 without fail. Similarly, when the connection between the connectors 117 and 124 is loosened due to the external force on the plane parallel to the lines α and β, the connection between electrodes 15, 16 and 22, 23 is tightened. Thus, also in this case, the electrical power is supplied from the battery grip 2' to the camera 1' without fail.

[The Third Embodiment]

Figure 5A:
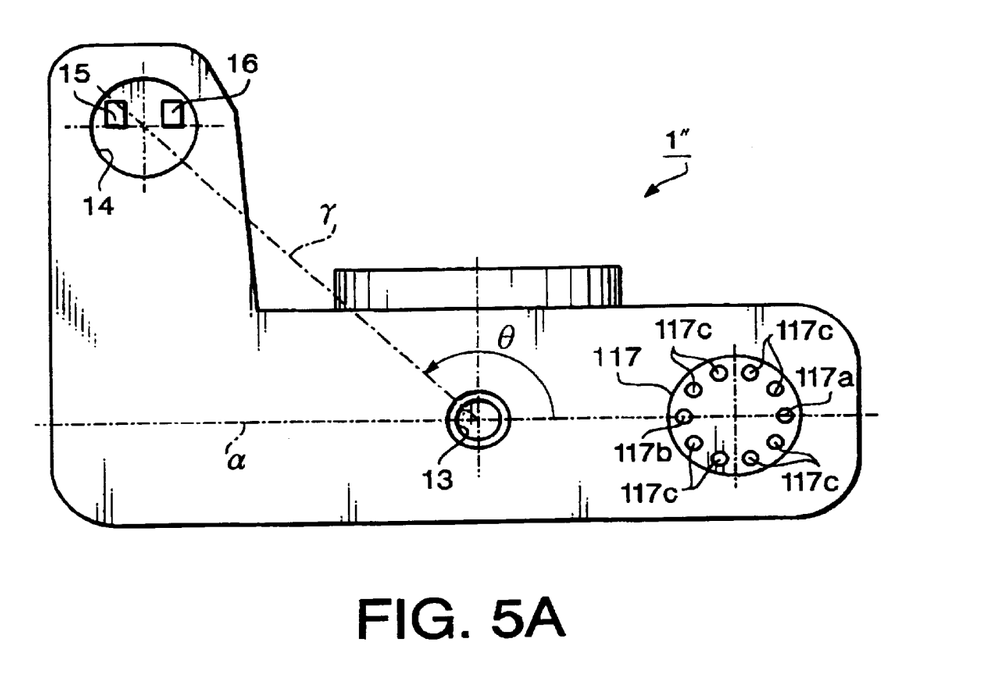
FIG. 5A is a bottom view of a camera according to a third embodiment of the invention.
Figure 5B:
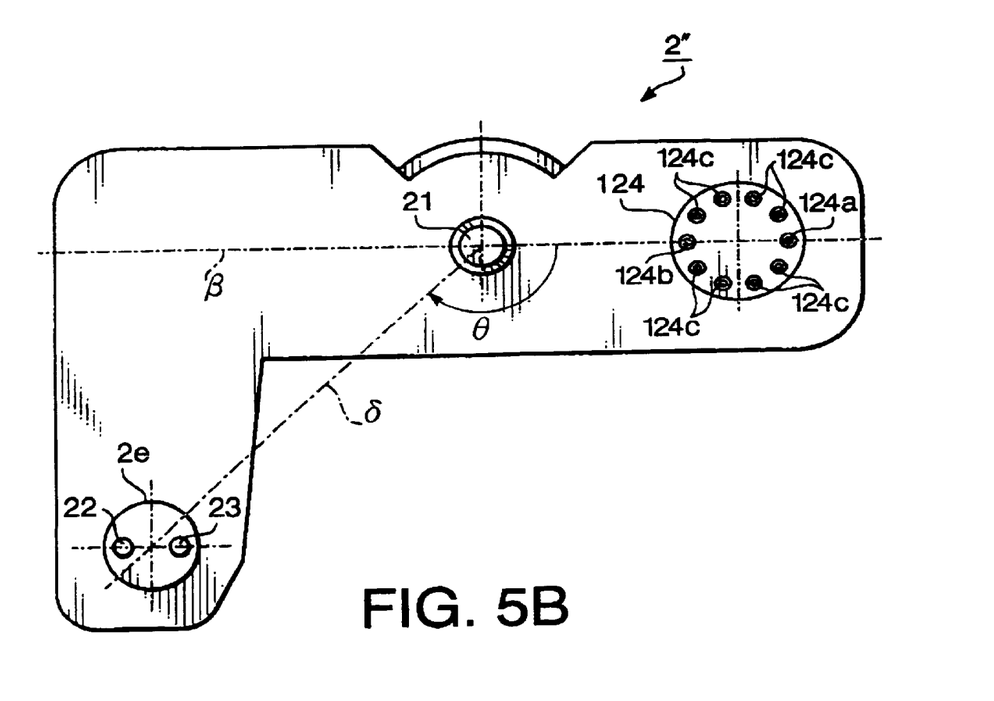
FIG. 5B is a plan view of a battery grip according to the third embodiment of the invention.

FIG. 5A is a bottom view of a camera 1", and FIG. 5B is a plan view of a battery grip 2" according to the third embodiment of the present invention.

In the third embodiment, the structure of the contacts 117 and 124 are identical to that of the second embodiment. Only the arrangement of the electrodes 15, 16, 22, 23 are different from the second embodiment.

As shown in FIGS. 5A and 5B, camera 1" is L-shaped viewed from the bottom, and correspondingly, the battery grip 2" is also L-shaped viewed from the top. Due to this structure, a line γ connecting the center of the electrodes 15 and 16 and the center of the threaded hole 13 and a line α connecting the center of the threaded hole 13 and the contacts 117a and 117b on a plane parallel to the bottom surface 1a form an angle θ. Accordingly, a line β connecting the center of the bolt 21 and the pins 124a and 124b, and a line δ connecting the center of the bolt 21 and the center of the electrodes 22 and 23 on a plane parallel to the upper surface 2a form the same angle θ.

Possibility of the electrodes 22 and 23 detaching from the electrodes 15 and 16 is the greatest when the external force is applied on a plane including the line δ and perpendicular to the surfaces 1a and 2a. Since the connectors 117 and 124 are provided on an opposite side of the electrodes 15, 16, 22 and 23 (i.e., 90°≦θ≦27°), when connection between electrodes 15, 16 and 22, 23 is loosened due to the external force on the plane including the line δ and perpendicular to the surfaces 1a and 2a, the connection between the connectors 117 and 124 is tightened. Thus, the electrical power is supplied from the battery grip 2" to the camera 1" without fail. Similarly, when the connection between the connectors 117 and 124 is loosened due to the external force on the plane including the line δ and perpendicular to the surfaces 1a and 2a, the connection between electrodes 15, 16 and 22, 23 is tightened. Thus, also in this case, the electrical power is supplied from the battery grip 2' to the camera 1' without fail.

It should be noted that the second embodiment is a particular case where the above-defined angle θ is 180 degrees. As described above, the angle θ can be any angle greater than 90 degrees and less than 270 degrees. However, due to limitation in designing a camera, the angle θ may be limited to a value within a range of 135 degrees to 180 degrees (i.e., 135°≦θ≦180°).

The present disclosure relates to the subject matter contained in Japanese Patent Application No. HEI 10-175100, filed on Jun. 22, 1998, and Japanese Patent Application No. 11-63269, filed on Mar. 10, 1999, which are expressly incorporated herein by reference in their entireties.

What is claimed is:

1. A connection structure for connecting at least first and second circuits respectively provided in first and second devices, said first and second devices respectively having first and second surfaces, said second device being secured to said first device, with said first and second surfaces in contact by a single screw provided to said second device and a threaded hole, which receives said screw, formed on said first device, said connection structure comprising:

first and second connectors provided on said first surface, each of said first and second connectors electrically connected to a common electrical line of said first circuit, said first and second connectors arranged at opposite sides of said threaded hole on said first surface;

third and fourth connectors respectively connectable to said first and second connectors, said third and fourth connectors provided on said second surface, each of said third and fourth connectors electrically connected to a common electrical line of said second circuit, said third and fourth connectors arranged at positions corresponding to said first and second connectors.

2. The connection structure according to claim 1, wherein said first contact, said threaded hole, and said second contact are arranged substantially on a same line.

3. The connection structure according to claim 1, wherein an angle formed between a line connecting said first contact and said threaded hole, and another line connecting said threaded hole and said second contact is within a range between 90 degrees to 270 degrees.

4. The connection structure according to claim 1, wherein a signal related to an operation of one of said first and second circuits is transmitted from the other of said first and second circuits, through said first, second, third and fourth connectors.

5. The connection structure according to claim 1, wherein electrical power is supplied from one of said first and second circuits to the other of said first and second circuits, through said first, second, third and fourth connectors.

6. A connection structure for connecting at least first and second circuits respectively provided in first and second devices, said first and second devices respectively having first and second surfaces, said second device being secured to said first device, with said first and second surfaces in contact by a single screw provided to said second device and a threaded hole, which receives said screw, formed on said first device, said connection structure comprising:

first and second connectors provided on said first surface, each of said first and second connectors electrically connected to a common electrical line of said first circuit;

third and fourth connectors respectively connectable to said first and second connectors, said third and fourth connectors provided on said second surface, each of said third and fourth connectors electrically connected to a common electrical line of said second circuit;

said first, second, third and fourth connectors being configured such that:

(a) said first and second connectors being connected to said third and fourth connectors, respectively in a neutral condition, (b) if said first connector is detached from said third connector, a connection between said second and fourth connectors are tightened, and (c) if said second connector is detached from said fourth connector, a connection between said first and third connectors are tightened.

7. The connection structure according to claim 6, wherein said first contact, said threaded hole, and said second contact are arranged substantially on a same line.

8. The connection structure according to claim 6, wherein an angle formed between a line connecting said first contact and said threaded hole, and another line connecting said threaded hole and said second contact is within a range between 90 degrees to 270 degrees.

9. The connection structure according to claim 6, wherein a signal related to an operation of one of said first and second circuits is transmitted from the other of said first and second circuits, through said first, second, third and fourth connectors.

10. The connection structure according to claim 6, wherein electrical power is supplied from one of said first and second circuits to the other of said first and second circuits, through said first, second, third and fourth connectors.

11. A camera system, comprising:

a camera;

an accessory to be secured to said camera, at least first and second circuits being respectively provided in said camera and said accessory, said accessory being secured to said camera by a screw provided to an upper surface of said accessory and a threaded hole formed on a bottom surface of said camera, first and second connectors provided on said bottom surface of said camera, each of said first and second connectors electrically connected to a common electrical line of said first circuit, said first and second connectors arranged at opposite sides of said threaded hole on said bottom surface of said camera; and third and fourth connectors respectively connectable to said first and second connectors, said third and fourth connectors provided on said upper surface of said accessory, each of said third and fourth connectors electrically connected to a common electrical line of said second circuit, said third and fourth connectors arranged at positions corresponding to said first and second connectors.

12. The camera system according to claim 11, wherein said second circuit supplies electric power for operation to said first circuit through said first, second, third and fourth connectors.

13. The camera system according to claim 12, wherein said accessory is a battery grip, and wherein said second circuit includes a battery.

14. The camera system according to claim 13, wherein said first connector includes electrodes provided in a battery chamber of said camera, and wherein said third connector includes electrodes provided on a adapter to be inserted in said battery chamber.

15. The camera system according to claim 11, wherein said second circuit supplies a signal related to an operation of said first circuit through said first, second, third and fourth connectors.

16. The camera system according to claim 11, wherein said second circuit includes a switch member, and wherein said second circuit transmits a signal upon operation of said switch member.

17. The camera system according to claim 11, wherein an angle formed between a line connecting said first contact and said threaded hole, and another line connecting said threaded hole and said second contact is within a range between 90 degrees to 270 degrees.

18. The camera system according to claim 11, wherein an angle formed between a line connecting said first contact and said threaded hole, and another line connecting said threaded hole and said second contact is within a range between 225 degrees to 180 degrees.

* * * * *